June 19, 1928.
F. M. REID
1,673,846
VEHICLE FOR TRANSPORTING HEAVY LOADS
Filed June 23, 1926 2 Sheets-Sheet 1
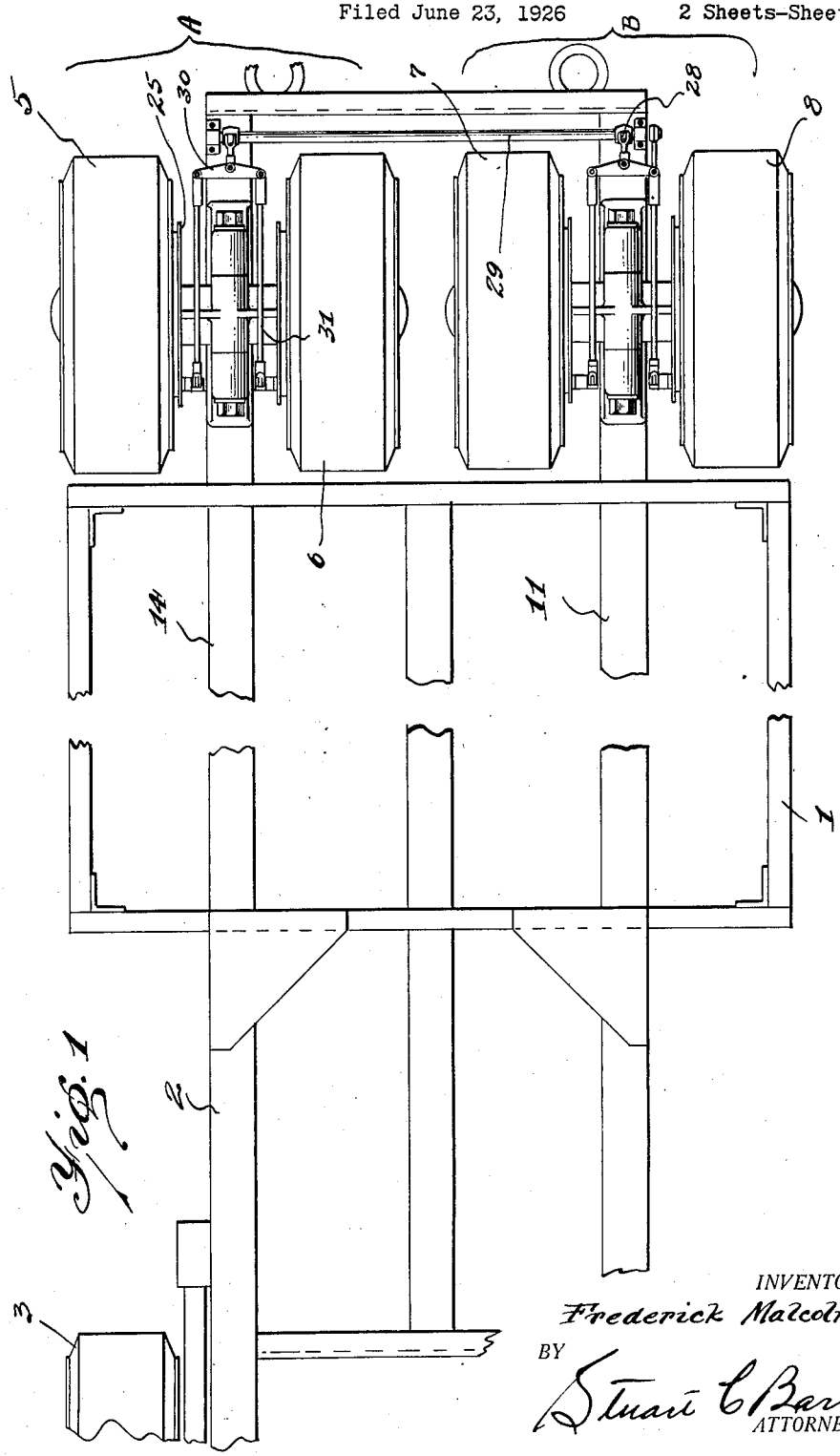

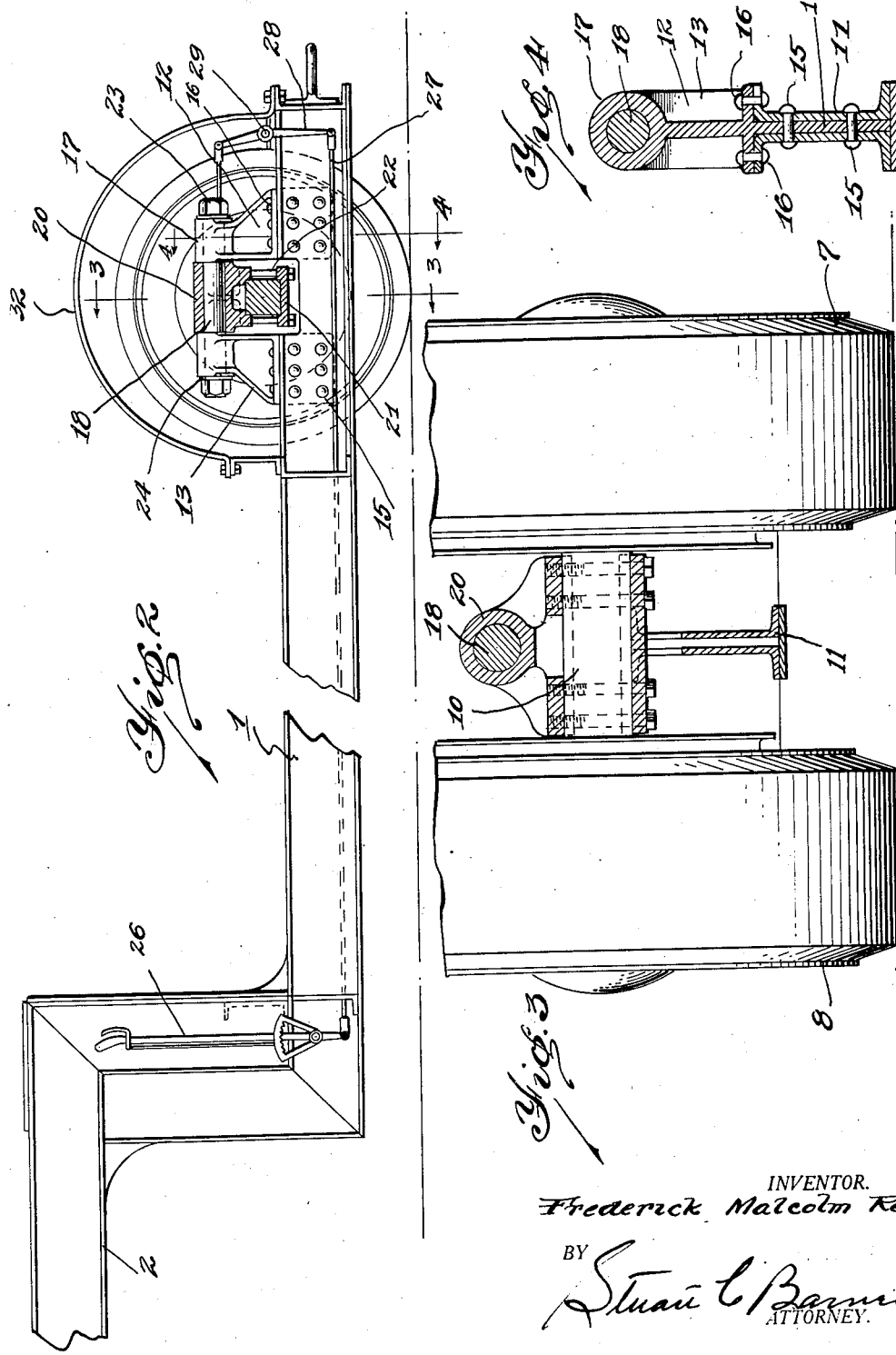

Patented June 19, 1928.

1,673,846

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

VEHICLE FOR TRANSPORTING HEAVY LOADS.

Application filed June 23, 1926. Serial No. 117,903.

This invention relates to vehicles and has to do particularly with vehicles of the type for transporting heavy loads.

In transporting heavy loads there is danger of damaging the roadway, unless adequate road contacting area is provided by the wheels of the vehicle. In many localities, especially in the cities, certain specifications must be complied with which require that the road contacting surface be sufficient in proportion to the load carried that the roads will not be damaged. Ordinary vehicles, or trucks, have no particular difficulty in meeting these specifications, but where extremely heavy loads are to be transported, compliance with such specifications presents a difficult problem. As an example of such a load, the well-known excavating machine may be cited. These machines are moved from place to place as their jobs are completed, and while many of these machines are capable of moving on their own power, this is extremely slow, and damaging to the finer mechanism by reason of the vibration. In some of the larger machines of this type, it has been necessary to dismantle them to move them, and this, of course, is undesirable in many respects.

In accordance with the invention, a vehicle for carrying heavy loads is constructed in such a way as to provide ample road contacting surface. The vehicle includes a frame for supporting the load, and the frame is carried by wheels in sufficient numbers to prevent damage to the road. These wheels are preferably arranged in a row extending transversely to the length of the vehicle, and they are arranged, and joined to the vehicle frame, so as to accommodate for road irregularities in such a way that the load will be distributed substantially evenly to all of the wheels regardless of such irregularities in the roadway.

The invention is exemplified in the accompanying drawings wherein Fig. 1 is a plan view of the load supporting part of the vehicle; Fig. 2 is a side elevation partly in section; Fig. 3 is a sectional view taken on line 3—3 of Fig. 2; and Fig. 4 is an enlarged section taken on line 4—4 of Fig. 2.

Referring to the drawings, the vehicle is shown in the form of a trailer adapted to be drawn by a tractor. The vehicle includes a frame 1 for supporting the major part of the load, and the forward end of the frame may be considerably higher as shown at 2. This forward end is supported by wheels 3, and a fifth wheel construction (not shown) may be used in the customary manner. The forward end of the vehicle is not important, as the invention is concerned mainly in the load-supporting part of the vehicle.

The frame is supported by a plurality of wheels, four of which are shown in the present instance. The wheels are arranged in pairs, the wheels 5 and 6 forming one pair A, and the wheels 7 and 8 forming the pair B. The wheels 7 and 8 are rotatably mounted upon the ends of an axle 10, and the central portion of the axle may be square in cross section. A longitudinal member 11 of the frame, is underslung on the axle and supported thereby. For this purpose a pair of brackets 12 and 13 are bolted or riveted to the longitudinal member. As indicated in Fig. 4 the frame member may be in the form of an I beam which is built up of channel members having an insert disposed between them, and plate members may be placed along the sides of the channel members. With this type of I beam, the brackets may rest upon the top of the beam and be screwed thereto by means of rivets 16, and have a portion 19 which lies between the channel members and which is secured by rivets 15. The insert may be cut away at the place where the bracket is located for this purpose. These brackets have, at their upper ends bearings 17 through which a pin 18 passes. Secured to the axle, is a member 20 also in the form of a bearing for receiving the pin. The member 20 may be clamped to the axle by means of a plate 21 and bolts 22. The pin 18 may take the form of an ordinary, large bolt threaded at each end for receiving nuts 23, and suitable washers 24 may be interposed if desired.

The wheels 5 and 6 of the group A are identical with wheels 7 and 8 of the group B and are connected to a longitudinal member 14 of the frame. By this construction it will be seen that the load is carried by two pairs of wheels, and that each pair is connected to the vehicle frame in a pivotal manner. In case of an irregularity in the roadway, the wheels are caused to pivot upon the supporting pins 18 so that each wheel continues to support its share of weight. This may be exemplified by a contrast with a rigid structure as follows: Should the wheel supports be of a rigid construction, a raised part of the roadway which, for instance, would happen to come under the wheel 5 and raise the same, would cause the wheels 6 and 7 to be lifted from the roadway, thus throwing the entire weight on the outer wheels 5 and 8; by the pivotal arrangement, however, the raising of the wheel 5 causes a pivoting action of the group A. This lowers the wheel 6 so that it continues to support its share of the weight. Also, in case of an irregularity which tends to lift both of the wheels 5 and 6, the frame of the vehicle may rock upon the pin 18 which secures the wheels 7 and 8 to the frame, in such a manner that the weight is substantially evenly distributed to all of the wheels. A vehicle provided with two pairs of wheels is capable of giving road contact sufficient for transporting the ordinary run of heavy loads, but where still heavier loads are to be encountered the vehicle may be provided with more than two pairs of such wheels.

The vehicle may be provided with suitable braking mechanism which may take the form of brake drums 25 on each of the wheels. These brakes may be operable by a lever 26 connected through a rod 27, and bell crank 28, to a rock shaft 29. The bell crank 28 may be connected through equalizing levers 30, and rods 31, to the brake drums. Suitable ratchet and pawl mechanism may be provided as shown. Also guards 32 may be provided for guarding against contact with the portions of the wheels which extend above the frame.

While the invention has been exemplified in the drawing by a vehicle in the form of a trailer, it will be understood that it is not my intention to so limit the invention, since the construction is adaptable to vehicles which are moved under their own power. The vehicle is shown with an underslung frame. This is desirable in many respects, among which is the facilitating of the loading and unloading of heavy articles. However, the invention contemplates as well, a frame which is not underslung but which is supported above the axle. Also, the vehicle may be in the form of a so-called semi-trailer wherein the forward end rests directly upon a tractor, usually through a fifth wheel construction, instead of being provided with wheels of its own.

I claim:

1. In a vehicle, the combination of a vehicle frame having a pair of longitudinally extending frame members, each frame member being of built-up I-beam construction including a pair of outside channel members with an insert member between the channel members, each insert member being cut away at a point, a bracket having a portion fitting between the channel members at the point where the insert member is cut away and secured to the I-beam, each bracket extending upwardly from the I-beam, a longitudinally extending pivot member carried by each bracket, an axle pivotally carried on each longitudinally extending pivot member, each axle being provided with a wheel at each end whereby each axle and its wheels can pivot independently of the other axle and wheels.

2. In a vehicle, the combination of a vehicle frame having a pair of longitudinally extending frame members, each of which consists of at least two portions, a bracket having a portion fitting tightly between the two portions of each frame member and secured to both portions by rivets extending through both of the portions and the bracket, said bracket extending upwardly from the central line of the frame member and being arranged to carry a longitudinally extending pivot member so that the frame member is suspended in a substantially vertical line from the pivot member, a transversely extending axle pivotally carried by each longitudinally extended pivotal member, each axle having a wheel at its ends whereby one axle and its wheels can pivot independently of the other axle and wheels.

3. In a vehicle, the combination of a vehicle frame and built up I-beam construction including two frame members positioned back to back with an insert member between them, said insert member being cut away at a point, a bracket having a portion fitting in between the two frame members at the point where the insert is cut away and being secured to the frame members, said bracket extending outwardly from the frame members, and means for mounting a wheel carrying axle on said bracket.

In testimony whereof I affix my signature.

FREDERICK MALCOLM REID.